United States Patent
Sachs et al.

(10) Patent No.: US 10,285,124 B2
(45) Date of Patent: May 7, 2019

(54) NETWORK NODE, METHODS THEREIN, COMPUTER PROGRAMS AND COMPUTER-READABLE MEDIUMS COMPRISING THE COMPUTER PROGRAMS, FOR KEEPING WIRELESS DEVICES IN ACTIVE MODE

(71) Applicant: Telefonaktiebolaget LM Ericsson (publ), Stockholm (SE)

(72) Inventors: Joachim Sachs, Sollentuna (SE); Andreas Höglund, Solna (SE); Osman Nuri Can Yilmaz, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 37 days.

(21) Appl. No.: 15/522,330

(22) PCT Filed: Oct. 30, 2014

(86) PCT No.: PCT/SE2014/051286
§ 371 (c)(1),
(2) Date: Apr. 27, 2017

(87) PCT Pub. No.: WO2016/068766
PCT Pub. Date: May 6, 2016

(65) Prior Publication Data
US 2017/0367048 A1      Dec. 21, 2017

(51) Int. Cl.
*H04W 52/02* (2009.01)
*H04W 76/28* (2018.01)
(Continued)

(52) U.S. Cl.
CPC ....... *H04W 52/0219* (2013.01); *H04W 16/18* (2013.01); *H04W 16/32* (2013.01);
(Continued)

(58) Field of Classification Search
CPC . H04W 52/0219; H04W 16/32; H04W 76/28; H04W 76/27; H04W 24/02;
(Continued)

(56) References Cited

U.S. PATENT DOCUMENTS

2002/0167957 A1* 11/2002 Brandt ............... H04Q 11/0478
370/412
2003/0166408 A1    9/2003 Zhang et al.
(Continued)

*Primary Examiner* — Walli Z Butt
(74) *Attorney, Agent, or Firm* — Patent Portfolio Builders, PLLC

(57) ABSTRACT

Method performed by a network node (110) for keeping wireless devices (140) served by the network node (110) in active mode. Each of the wireless devices has a value for a first condition. The network node (110) determines whether each of the wireless devices has the value for the first condition among a number of highest values for the first condition. The first condition is associated with a need to be in active mode. The number of highest values for the first condition corresponds to a maximum amount of wireless devices allowed to be in the active mode simultaneously. The network node (110) updates a register, so that the wireless devices (140) in the register have the highest values for the first condition, according to the maximum amount. The network node (110) keeps the wireless devices (140) in the updated register in active mode.

15 Claims, 5 Drawing Sheets

(51) Int. Cl.
*H04W 76/27* (2018.01)
*H04W 16/18* (2009.01)
*H04W 16/32* (2009.01)
*H04W 24/02* (2009.01)

(52) U.S. Cl.
CPC ....... *H04W 24/02* (2013.01); *H04W 52/0206* (2013.01); *H04W 76/27* (2018.02); *H04W 76/28* (2018.02); *Y02D 70/00* (2018.01); *Y02D 70/1226* (2018.01); *Y02D 70/1262* (2018.01); *Y02D 70/142* (2018.01); *Y02D 70/146* (2018.01); *Y02D 70/21* (2018.01); *Y02D 70/24* (2018.01)

(58) Field of Classification Search
CPC .. H04W 16/18; H04W 52/0206; Y02D 70/21; Y02D 70/1262; Y02D 70/24; Y02D 70/142; Y02D 70/1226; Y02D 70/146; Y02D 70/00
See application file for complete search history.

(56) References Cited

U.S. PATENT DOCUMENTS

| | | | |
|---|---|---|---|
| 2007/0177617 A1* | 8/2007 | Noh | H04W 76/19 370/401 |
| 2009/0023468 A1* | 1/2009 | Zhang | H04W 72/121 455/522 |
| 2013/0229959 A1 | 9/2013 | Ghosh et al. | |
| 2014/0213277 A1 | 7/2014 | Jang | |
| 2015/0043403 A1* | 2/2015 | Martinez Tarradell | H04W 76/14 370/311 |

\* cited by examiner

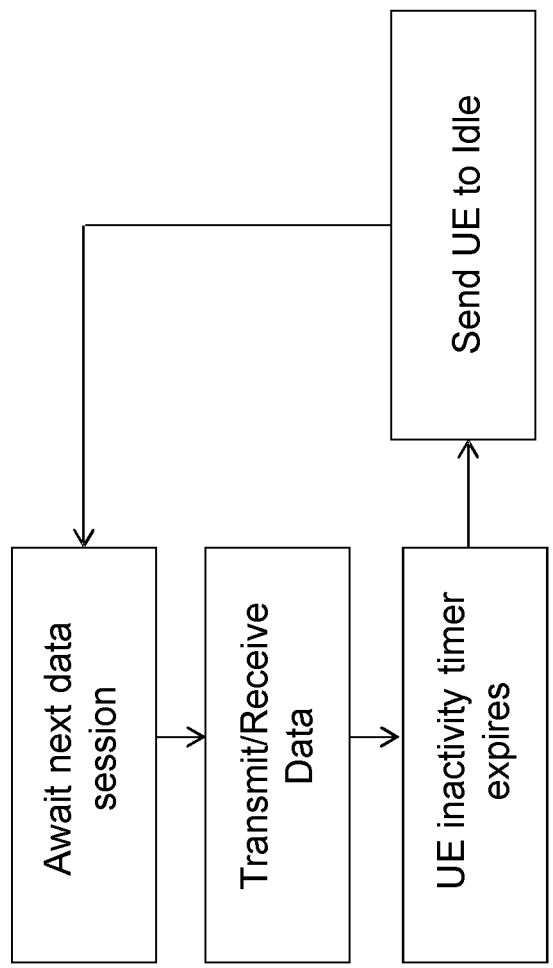

NETWORK NODE, METHODS THEREIN, COMPUTER PROGRAMS AND COMPUTER-READABLE MEDIUMS COMPRISING THE COMPUTER PROGRAMS, FOR KEEPING WIRELESS DEVICES IN ACTIVE MODE

TECHNICAL FIELD

The present disclosure relates generally to a network node and methods therein for keeping wireless devices in active mode. The present disclosure further relates generally to computer programs and computer-readable storage mediums, having stored thereon the computer programs to carry out these methods.

BACKGROUND

Communication devices such as terminals are also known as e.g. User Equipments (UE), wireless devices, mobile terminals, wireless terminals and/or mobile stations. Terminals are enabled to communicate wirelessly in a cellular communications network, also referred to as wireless communication system, cellular radio system or cellular network. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cells, wherein each cell being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations, based on transmission power and thereby also cell size, may be of different classes such as e.g. macro eNodeB, home eNodeB or pico base station. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

In 3$^{rd}$ Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Machine Type Communication (MTC) is a form of data communication which involves one or more entities that do not necessarily need human interaction. MTC devices are devices which communicate through MTC. In some particular embodiments, MTC devices are wireless devices equipped for Machine Type Communication, as just described, which wireless devices communicate through a Public Land Mobile Network (PLMN) with MTC Server(s) and/or other MTC Device(s). An MTC Server is a server, which communicates to the PLMN itself, and to MTC Devices through the PLMN. The MTC Server also has an interface which may be accessed by the MTC User. The MTC Server performs services for the MTC User. A MTC User uses the service provided by the MTC Server. MTC devices may be, for example, home and/or building automation devices, alarms, emission control, toll payment devices, people tracking devices, parcel tracking devices, sensor networks, industrial automation devices, personal network devices etc. . . . .

Given the lesser capabilities of low cost MTC devices, such as those having only one antenna etc. . . . , and the fact that MTC devices often are to be placed in basements and locations with poor coverage, coverage enhancements may be an important enabler for these devices. To improve coverage, more energy, in general, may need to be accumulated in the time or frequency domain. Typically, since the devices may be power limited, it may make sense to use the time domain and transmit narrow band in UL, to provide a higher UL capacity, so that other UEs may use the remaining bandwidth. In a Release 12 work item in 3GPP, repetitions in time have been proposed for extending the coverage of MTC devices of up to 15 dB. More repetitions increase the received energy, which results in a higher signal-to-noise ratio, and thus, in an extension of the coverage of the signals transmitted and received by the MTC devices.

The problem with coverage enhancements is that the transmission of a given amount of data becomes much more expensive in terms of resource consumption. In the case of repetitions, for example, each transmission may have to be repeated over a hundred times.

Thus, existing methods for coverage enhancement involve high resource overhead, which may negatively affect the performance of a wireless communications network by over-usage of time and frequency resources. This problem affects also other variables related to communication methods in wireless devices, such as battery life and latency. Unnecessary usage of time and frequency resources may negatively affect wireless devices with low battery life, or wireless devices experiencing long latency.

SUMMARY

It is an object of embodiments herein to improve the performance in a wireless communications network by improving the usage of resources in communications involving wireless devices.

According to a first aspect of embodiments herein, the object is achieved by a method performed by a network node for keeping wireless devices in active mode. The wireless devices are comprised in a group of wireless devices served by the network node. Each of the wireless devices in the group of wireless devices has a value for a first condition. The group of wireless devices and the network node operate in a wireless communications network. The network node determines whether each of the wireless devices in the group of wireless devices has the value for the first condition among a number of highest values for the first condition in the group of wireless devices. The first condition of each of the wireless devices in the group of wireless devices is associated with a need to be in active mode. The number of highest values for the first condition corresponds to a maximum amount of wireless devices in the group of wireless devices allowed to be in the active mode simultaneously. Based on the determining, the network node updates a register of wireless devices to be kept in active mode, so that the wireless devices in the register have the highest values for the first condition in the group, according to the maximum amount of wireless devices in the group of wireless devices allowed to be in the active mode simultaneously. The network node keeps the wireless devices in the updated register in active mode.

According to a second aspect of embodiments herein, the object is achieved by a network node configured to keep wireless devices in active mode. The wireless devices are arranged to be comprised in a group of wireless devices configured to be served by the network node. Each of the wireless devices in the group of wireless devices is configured to have a value for a first condition. The group of wireless devices and the network node are configured to operate in a wireless communications network. The network node is further configured to determine whether each of the wireless devices in the group of wireless devices has the value for the first condition among a number of highest values for the first condition in the group of wireless devices. The first condition of each of the wireless devices in the group of wireless devices is associated with a need to be in active mode. The number of highest values for the first condition corresponds to a maximum amount of wireless devices in the group of wireless devices allowed to be in the active mode simultaneously. Based on the determination, the network node is configured to update a register of wireless devices to be kept in active mode, so that the wireless devices in the register have the highest values for the first condition in the group, according to the maximum amount of wireless devices in the group of wireless devices allowed to be in the active mode simultaneously. The network node is further configured to keep the wireless devices in the updated register in active mode.

According to a third aspect of embodiments herein, the object is achieved by a computer program, comprising instructions which, when executed on at least one processor, cause the at least one processor to carry out the method performed by the network node.

According to a fourth aspect of embodiments herein, the object is achieved by a computer-readable storage medium, having stored thereon the computer program, comprising instructions which, when executed on at least one processor, cause the at least one processor to carry out the method performed by the network node.

By keeping the wireless devices in the updated register in active mode, the network node avoids repeating the lengthy active mode setup procedure for these devices, and therefore improves the usage of resources in the wireless communications network by saving resources. Furthermore, the network node also saves resources by selectively keeping only a number of wireless devices in active mode: those wireless devices needing the most to stay in active mode. That is, those wireless devices having the highest values for the first condition.

For example, the first condition mentioned in the aspects described above may be a need for enhancement of coverage, that is, a need for coverage enhancement. By keeping the wireless devices having the highest need for enhancement of coverage in active mode, the network node avoids the lengthy active mode setup procedure for each transmission for these wireless devices. The active mode may be, e.g., a Radio Resource Control (RRC)_Connected mode, and the active mode setup may be, e.g., an RRC Connection Setup. Therefore, resources are saved, which is particularly useful for low quality MTC devices. Moreover, the network node also saves resources by selectively providing coverage enhancement to only those wireless devices needing it most. The network node considers the overhead incurred also by providing the coverage enhancement only to the maximum amount of wireless devices allowed to be in the active mode simultaneously.

Furthermore, by updating the register of wireless devices, the network node provides the coverage enhancement in a dynamic fashion, providing coverage enhancement only to those wireless devices needing it the most at a particular point in time.

These advantages are also applicable to other conditions associated, for example, with battery life and latency.

Further advantages of some embodiments disclosed herein are discussed below.

BRIEF DESCRIPTION OF THE DRAWINGS

Examples of embodiments herein are described in more detail with reference to the accompanying drawings, in which.

DETAILED DESCRIPTION

Figure 1:
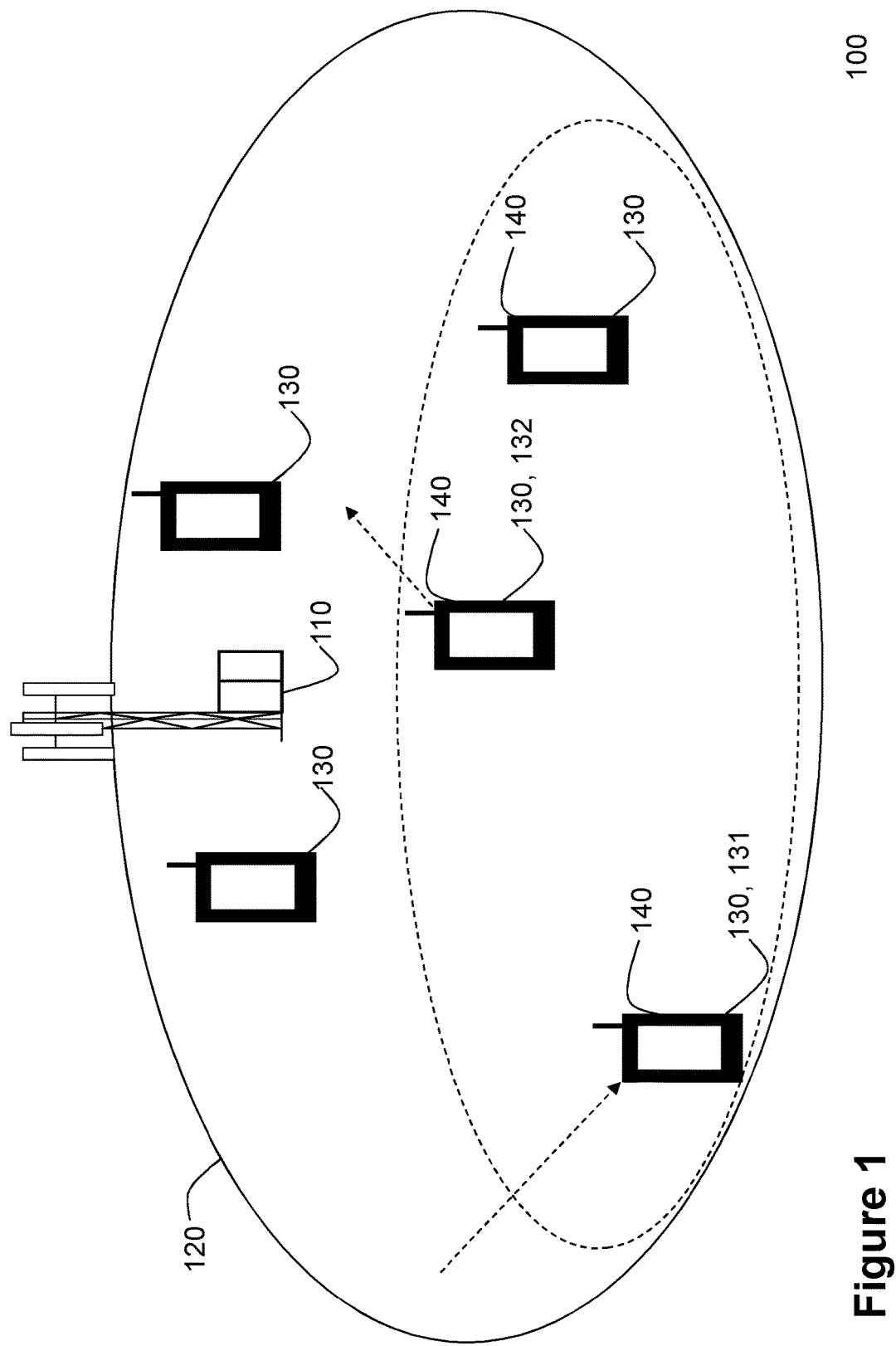
FIG. 1 is a schematic diagram illustrating embodiments in a wireless communications network, according to some embodiments.

As part of the solution according to embodiments herein, a problem will first be identified and discussed.

As mentioned earlier, existing methods for coverage enhancement involve high resource overhead, which may in turn negatively affect the performance of a wireless communications network. Thus, the control signaling overhead must be kept to a minimum for MTC devices in need of coverage enhancements. Since transmission repetitions have been proposed as a mechanism for extending the coverage of MTC devices, a possible approach to control signaling overhead in these repetitions may be to avoid the lengthy connection procedure, e.g., the RRC Connection Setup procedure, for each transmission for these devices by keeping them in active or connected mode, e.g., RRC Connected Mode. An enabler for this may be, for example, extended Discontinuous Reception (DRX)-cycles in connected mode. The problem of using transmission repetitions to provide for coverage enhancement is that it may not be possible to keep large number of devices in active mode. This may be due to practical limitations in the base station. The most severe of these limitations may be the hardware consumption incurred by keeping the UE contexts for the connection in memory at the base station. A network node UE context is a block of information in a network node, e.g., an eNB, associated to one active UE. The block of information may contain the necessary information required to maintain the network services towards the active UE, such as UE state information, security information, UE capability information and the identities of the UE-associated logical S1-connection. A UE context may be established when the transition to active state for a UE is completed.

Embodiments herein address the foregoing problems by providing an improved communication method for wireless devices, such as MTC devices. Particular embodiments herein improve the performance in a wireless communications network by providing an improved coverage enhancement method, which may be applied to MTC devices. In particular, the improved coverage enhancement method tries to minimize the resources overhead that may be incurred by coverage enhancement. Other particular embodiments herein improve the performance in a wireless communications network by providing an improved communication method for wireless devices with low battery life, or experiencing long latency Embodiments herein further address the foregoing problems by selectively choosing which MTC devices may be kept in active mode. More precisely, the MTC devices needing the largest amount of coverage enhancement may be given the highest priority to always be kept in active mode. Hence, the number of devices in active mode is controlled. The need for coverage enhancement may be measured based on e.g., the path loss.

In addition, other conditions than the need for coverage enhancement may be considered for wireless devices to be kept in connected mode. First, the latency requirements or statistics may be used as a second condition. Avoiding the connection setup procedure, e.g., the RRC Connection Setup procedure, may give significantly better latency performance. Second, the second condition may be based on wireless device power consumption, e.g., either keeping the wireless devices with the most strict battery life requirements in connected mode, or keeping the wireless devices with least remaining battery life, according to some battery indicator in connected mode. Third, mobility may be considered either as an additional second condition or a stand-alone second condition since the keeping wireless devices in the connected mode is very beneficial for relatively stationary wireless devices, i.e., not changing cells frequently, but it may even become a disadvantage for very mobile wireless devices with very infrequent traffic because of the procedures associated with cell changes.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

FIG. 1 depicts a wireless communications network 100 in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi network, Worldwide Interoperability for Microwave Access (WiMax), 5G system or any cellular network or system.

The wireless communications network 100 comprises a network node 110. The network node 110 may be a base station such as e.g. an eNB, eNodeB, or a Home Node B, a Home eNode B, femto Base Station, BS, or any other network unit capable to serve a wireless device or a machine type communication device in the wireless communications network 100. The network node 110 may be e.g. macro eNodeB, or pico base station, based on transmission power and thereby also cell size. In some particular embodiments, the network node 110 may be a stationary relay node or a mobile relay node. The wireless communications network 100 covers a geographical area which is divided into cells, wherein each cell is served by a network node, although, one network node may serve one or several cells. In the example depicted in FIG. 1, the network node 110 serves a cell 120. Typically, the wireless communications network 100 may comprise more cells similar to the cell 120, served by their respective network nodes. This is not depicted in FIG. 1 for the sake of simplicity. The network node 110 may support one or several communication technologies, and its name may depend on the technology and terminology used.

A number of wireless devices are located in the wireless communications network 100. In the example scenario of FIG. 1, only five wireless devices are shown to represent a group of wireless devices 130 served by the network node 110. The wireless devices in the group of wireless devices 130 may also be referred to herein as the wireless devices 130 of the group. The group of wireless devices 130 comprises a first wireless device 131 and a second wireless device 132. The group of wireless devices 130 also comprises wireless devices 140, which are the wireless devices to be kept in active mode, as will described below. These wireless devices 140 are encompassed by a dashed oval in FIG. 1. Each of the wireless devices in the group of wireless devices 130 may communicate with the network node 110 over a radio link, which is not illustrated to simplify FIG. 1.

Each of the wireless devices in the group of wireless devices 130 is a wireless communication device such as a UE which is also known as e.g. mobile terminal, wireless terminal and/or mobile station, a mobile telephone, cellular telephone, or laptop with wireless capability, just to mention some further examples. Each of the wireless devices in the group of wireless devices 130 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device, modems, or any other radio network unit capable of communicating over a radio link in a cellular communications system. Each of the wireless devices in the group of wireless devices 130 is wireless, i.e., it is enabled to communicate wirelessly in the wireless communication network 100, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless communications network 100.

Particular embodiments of wireless devices, such as each of the wireless devices in the group of wireless devices 130, that may be served by such a system include Machine Type Communication (MTC) devices such as sensors, and any type of UEs using coverage enhancements.

Figure 2:
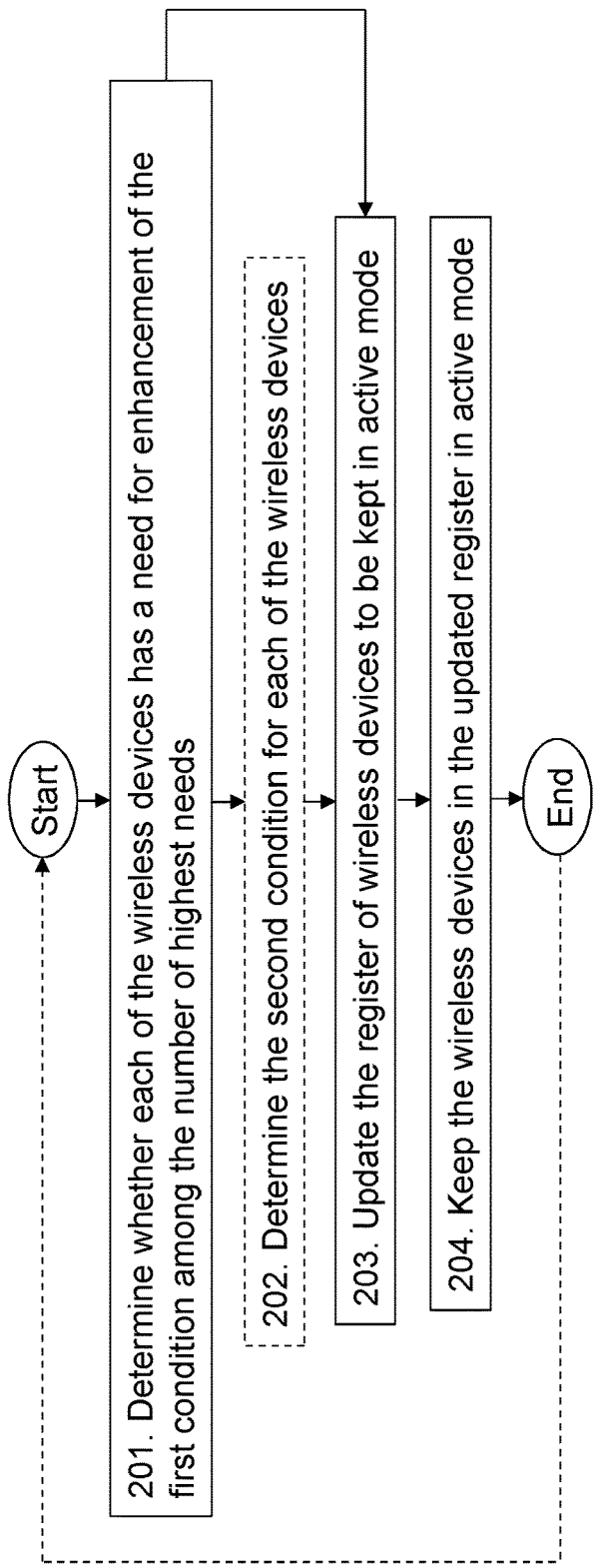
FIG. 2 is a schematic diagram illustrating embodiments of a method in a network node, according to some embodiments.

Embodiments of a method performed by a network node 110 for keeping wireless devices 140 in active mode, will now be described with reference to the flowchart depicted depicted in FIG. 2. As stated earlier, the wireless devices 140 are comprised in the group of wireless devices 130 served by the network node 110. Each of the wireless devices in the group of wireless devices 130 has a value for a first condition. The first condition of each of the wireless devices in the group of wireless devices 130 is associated with a need to be in active mode. In some particular embodiments, the active mode may also be referred to as Connected Mode. In even more particular embodiments, the active mode is an RRC_Connected mode. The first condition may be, for example, a need for enhancement of one of: coverage, latency, and battery life. The first condition is associated with the need to be in active mode in each of the wireless devices in the group of wireless devices 130 in the sense that the need for enhancement of a variable associated with the first condition, e.g., coverage, latency, battery life, in each of the wireless devices in the group of wireless devices 130 may be addressed by the wireless device in question staying in active mode. The need for enhancement of coverage may also be referred to herein as the need for coverage enhancement.

For example, in the case of coverage enhancement, a wireless device such as the first wireless device 131, with a need for coverage enhancement may benefit from repetition of transmissions. Thus, the first wireless device 131 may benefit from being in active mode and being able to carry out the repetition of transmissions.

In another example, in the case of latency, a wireless device such as the first wireless device 131, may have a need for enhancement of latency, that is, may have a need to improve latency, which in this case means a need to reduce a latency time. The first wireless device 131 may benefit from being in active mode and being able to react in a shorter amount of time, without having to, for example, go through a lengthy connection procedure.

Yet in another example, in the case of battery life, a wireless device such as the first wireless device 131, with a need for enhancement of battery life, that is, with a need to save battery life, may benefit from being in active mode and being able to save the battery power involved in a lengthy connection procedure.

How the value of the first condition may be achieved will be described later.

In the description herein, illustrative examples may be discussed in further detail, wherein the first condition is the need for enhancement of coverage. However, this should be understood to be to simplify the description, and to not be limiting to only embodiments wherein the first condition is the need for enhancement of coverage. The need for enhancement of coverage may also be referred to herein as the need for coverage enhancement.

As stated earlier, the group of wireless devices 130 and the network node 110 operate in the wireless communications network 100. FIG. 2 depicts a flowchart of the actions that are or may be performed by the network node 110 in embodiments herein. A dashed line depicts an optional action.

The method may comprise the following actions, which actions may as well be carried out in another suitable order than that described below.

Action 201

As just described, the wireless devices in the group of wireless devices 130 having the value for the first condition may benefit from being in active mode. However, the network node 110 may not be able to hold too many wireless devices in active mode due to memory restrictions and other limits, such as hardware limits. For example, with an RRC Connected mode, it may cost a lot of hardware resources to have a wireless device in connected mode, even if it may not be sending or receiving information. In order to comply with any hardware limitations the network node 110 may have, the network node 110 may select the wireless devices 140 to be kept in active mode. To be able to select the wireless devices 140 to be kept in active mode, the network node 110 may first determine the value of the first condition, e.g., the need for enhancement of coverage, for each of the wireless devices in the group of wireless devices 130. This may then allow the network node 110 to rank the wireless devices in the group of wireless devices 130, according to such value. The network node 110 may in this way determine the wireless devices in the group of wireless devices 130 which have the highest values of the first condition, e.g., the highest need for enhancement of coverage. The highest values are determined according to a maximum amount of wireless devices in the group of wireless devices 130 which are allowed to be in the active mode simultaneously. This maximum amount may be determined by the hardware characteristics of the network node 110, according to a maximal number, e.g., N, of wireless devices that may be kept in a memory of the network node 100. N may be lower than an absolute maximal value, to reserve room for e.g., non-MTC devices and new connections.

Thus, in this action, the network node 110 determines, e.g., at a time point, whether each of the wireless devices in the group of wireless devices 130 has the value for the first condition among a number of highest values for the first condition in the group of wireless devices 130. The value of the first condition may be based on a number of factors or quantities, depending on the variable, e.g., coverage, latency, battery life, involved. For example, in the case of coverage, the value may be based on: a) a number of repetitions needed for the random access or any other transmission; b) a previous coverage enhancement-level for stationary devices, wherein a certain coverage enhancement level corresponds to a certain number of repetitions, and wherein previous refers to a prior time point, c) the path loss, d) the indicated coverage enhancement-level, etc. . . . . The value may also be based on e) a number of indicators of low signal-to-noise ratio, which may be derived from RSRP/RSRQ, UL channel quality, or explicitly from channel estimation measurement.

In the case of latency, the value of the first condition may be a measured latency time, which may be based on latency requirements, latency statistics of previous transmissions, QoS profile, a service requirement, an application requirement, etc. . . . . In the case of battery life, the value of the first condition may be based on battery status, a battery life requirement, a 'battery operated' indicator, that is, a flag indicating that a wireless device runs on a battery, a group assignment, which group assignment may be an indication that the wireless device may belong to a specific group, receiving a special treatment, priority, type of application or ownership.

The number of highest values for the first condition corresponds to the maximum amount of wireless devices in the group of wireless devices 130 allowed to be in the active mode simultaneously.

Action 202

In some embodiments, the network node 110 may take into consideration one or more additional values in order to determine which of the wireless devices in the group of wireless devices 130 may be kept in active mode. This may be performed to achieve a better determination of which wireless devices 130 of the group are in a highest need to be in active mode. For example, in some cases, some wireless devices 130 of the group may have a same value for the first condition, and only one of them may stay in active mode according to the maximum amount of wireless devices in the group allowed to be in the active mode simultaneously. The network node 110 may then choose which wireless device may stay in active mode by evaluating one or more additional values of other conditions. Thus, in this action, the network node 110 may determine a value for a second condition for at least some of the wireless devices in the group of wireless devices 130. The value for the second condition of the at least some of the wireless devices in the group of wireless devices 130 is also associated with being kept in active mode.

The second condition may be a need for enhancement of one of: coverage, latency, battery life and mobility. In these embodiments where a second condition is evaluated, the first condition is different from the second condition. That is, if the first condition is the need for enhancement of coverage, the second condition may only be, for example, latency, battery life or mobility.

A need for enhancement of mobility is understood to refer to a need of a wireless device to stay mobile. As explained earlier, in this case, staying in connected, or in active mode for any of the wireless devices 130 in the group with high mobility may be detrimental. The value for the second condition, when the second condition is a need for enhancement of mobility may be based on e.g., mobility class, mobility indicator, mobility statistics, subscription data etc. . . . . .

In some embodiments, more than one second condition, wherein each second condition is different, may be determined by the network node 110.

This action is optional.

Action 203

In order to allow the network node 110 to keep track of the number of wireless devices 130 in the group to be kept in active mode, so that the maximum amount of wireless devices 130 in the group allowed to be in the active mode simultaneously is not exceeded, the network node 110 may keep a register of wireless devices 140 to be kept in active mode.

Thus, in this action, the network node 110, based on the determining of action 201, updates the register of wireless devices 140 to be kept in active mode, so that the wireless devices 140 in the register have the highest values for the first condition in the group 130, e.g., at the time point, according to the maximum amount of wireless devices in the group of wireless devices 130 allowed to be in the active mode simultaneously.

In some embodiments, the updating of the register comprises adding a wireless device in the group of wireless devices 130 to the register, removing a wireless device in the group of wireless devices 130 from the register, or confirming the presence of a wireless device in the group of wireless devices 130 in the register. Any of the adding and removing may be based on the maximum amount of wireless devices in the group of wireless devices 130 allowed to be in the active mode simultaneously. That is, whether any wireless device in the register needs to be removed or whether any wireless device may be added to the register, may consider whether the maximum amount of wireless devices in the group allowed to be in the active mode simultaneously has been reached. In other words, the update of the register may be performed according to this maximum amount limit. If this maximum amount has been reached, a wireless device from the register may need to be removed before a new one with a higher value for the first condition may be added. If this maximum amount has not been reached, a wireless device with a highest value for the first condition may be added to the register.

Figure 3B:
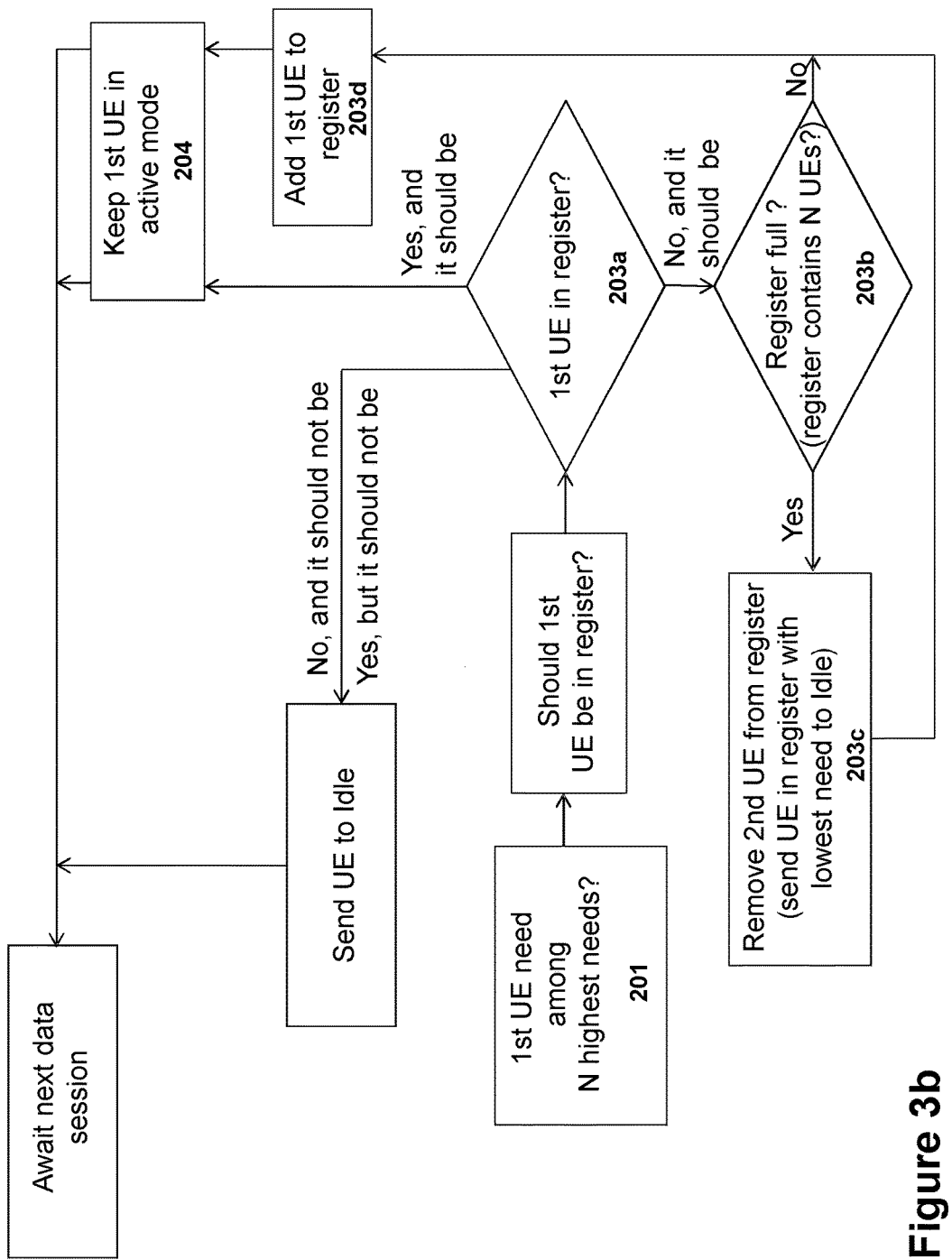
FIG. 3 is a flowchart illustrating embodiments of a method in a network node, according to some embodiments.

Hence, in some embodiments, the updating of action 202 may comprise any of the following actions, which are illustrated in FIG. 3b with abbreviated expressions, as further described later. In FIG. 3b, the first wireless device 131 is represented as $1^{st}$ UE.

Action 203a. The network node 110 may determine if each of the wireless devices 130 in the group, such as the first wireless device 131, are in the register. For example, the network node 110 may determine that the first wireless device 131 having the value for the first condition among the number of highest values for the first condition in the group of wireless devices 130, is not in the register of wireless devices 140 to be kept in active mode. This is represented in FIG. 3b by the box "$1^{st}$ UE in register?";

Action 203b. The network node 110 may determine if the register is full, that is if it contains e.g., N UEs, as represented in the Figure. This is represented in FIG. 3b by the diamond "Register Full? (register contains N UEs?)". For example, the network node 110 may determine that the register of wireless devices 140 to be kept in active mode comprises the maximum amount of wireless devices in the group of wireless devices 130 allowed to be in active mode simultaneously;

Action 203c. The network node 110 may remove a wireless device in the register with a lowest value for the first condition and send it to an Idle state. For example, the network node 110 may remove the second wireless device 132 from the register of wireless devices 140 to be kept in active mode, when the second wireless device 132 has a lower value for the first condition than the value for the first condition of the first wireless device 131. This is represented in FIG. 3b by the box "Remove $2^{nd}$ UE from register (Send UE in register with lowest need to Idle). This is also indicated in FIG. 1, by the dashed arrow moving from the second wireless device 132 outside of the dashed circle of wireless devices 140 to be kept in active mode; and Action 203d. In this action, the network node 110 may add the first wireless device 131 to the register of wireless devices 140 to be kept in active mode. This is represented in FIG. 3b by the box "Add $1^{st}$ UE to register". This is also indicated in FIG. 1, by the dashed arrow moving towards the first wireless device 131 inside the dashed circle of wireless devices 140 to be kept in active mode;

In other embodiments, which are not illustrated in any figure, the updating of action 203 may comprise any of the following actions:

Action 203e. In this action, the network node 110 may determine that the first wireless device 131 having the value for the first condition among the number of highest values for the first condition in the group of wireless devices 130, is not in the register of wireless devices 140 to be kept in active mode;

Action 203*f*. In this action, the network node 110 may determine that the register of wireless devices 140 to be kept in active mode does not comprise the maximum amount of wireless devices in the group of wireless devices 130 allowed to be in active mode simultaneously;

Action 203*g*. In this action, the network node 110 may add the first wireless device 131 to the register of wireless devices 140 to be kept in active mode.

In some embodiments, wherein the value of the second condition has been determined according to action 202, the network node 110 may update the register further based on the determination of the value for the second condition.

Action 204

In order to manage the first condition of the wireless devices in the group of wireless devices 130 that need it the most, in this action, the network node 110 keeps the wireless devices 140 in the updated register in active mode.

The active mode for a wireless device may, according to normal, or default, procedure, end when a timer expires. Keeping the wireless devices 140 in the active mode comprises the active mode continuing after the timer expires. That is, the wireless devices 140 in the updated register may stay in active mode beyond the usual configured length of the active mode. Keeping the wireless devices 140 in the active mode may be also understood as preventing the wireless devices 140 in the updated register from entering an inactive mode, e.g., an RRC Idle Mode.

In some embodiments, keeping the wireless devices 140 in active mode comprises extending Discontinuous Reception cycles in the Radio Resource Control_Connected mode. Always keeping the wireless devices 140 in active mode may be viewed as a specific case of using a timer value, i.e. timer set to infinity. In a general case, the RRC connection release timer may be determined to be a value from zero to infinity by a function of at least one of the above factors or quantities associated with the first condition and/or the second condition, e.g., the number of repetitions needed for the random access or any other transmission, the previous coverage enhancement-level for stationary devices, the path loss, the indicated coverage enhancement-level, the number of indicators of low signal-to-noise ratio, the latency requirements, the latency statistics of previous transmissions, the QoS profile, the service requirement, the application requirement, the battery status, the battery life requirement, the 'battery operated' indicator, the group assignment, etc. . . . .

It is understood that Actions 201-204 may be repeated at another time point, e.g., when the first condition for any of the wireless devices 130 of the group has changed.

By keeping the wireless devices 140 in the updated register in active mode, the network node 110 enhances whatever variable may be associated with the first condition, such as coverage, latency or battery life. This is done by substantially decreasing the resource consumption that is associated with transitioning a wireless device from an inactive mode to the active mode.

In particular embodiments, wherein the first condition is a need for coverage enhancement and the wireless devices 130 in the group are MTC devices, the network node 110 may provide coverage enhancement by selectively keeping MTC devices in Connected Mode, e.g., RRC_Connected Mode.

For these embodiments, the advantages of the disclosed method in the network node 110 are substantially decreased resource consumption due to the fact that RRC Connection establishment and tear-down would not be performed for every data transmission for coverage enhanced MTC devices.

In the case energy is accumulated in time domain as it may occur with repetitions of transmissions, the latency may also be reduced greatly for data transmissions to the MTC devices which are always kept in RRC Connected Mode.

A comparison of an example of the method disclosed herein with a legacy procedure is illustrated in FIG. 3*a* and FIG. 3*b*.

FIG. 3*a* illustrates a schematic flowchart for the legacy procedure for a wireless device to transition between the active and inactive modes. In the example depicted in the figure, the wireless device is a UE. According to the legacy procedure, the UE, in the active state, may transmit and/or receive data during a data session. This is depicted in the Figure with the box "Transmit/Receive Data". The timer referred to above may keep track of any inactivity of the wireless device during this active mode, e.g., RRC Connected Mode. After a certain time of inactivity, the timer may expire. This is depicted in the Figure with the box "UE inactivity timer expires". The UE may then be sent to the inactive state, which is depicted in the Figure as "Send UE to Idle". This may be performed, for example, by a network node sending the wireless device to RRC Idle Mode. The UE may then stay idle and await the next data session. This is depicted in the Figure with the box "Await next data session".

FIG. 3*b* illustrates a schematic flowchart of particular embodiments of the method disclosed herein, in a more detailed fashion. Some of the actions 201-204 described above are illustrated in the form of abbreviated questions with "Yes" or "No" answers. Where the outcomes of the questions are represented, the questions are depicted by diamonds. Rectangular boxes indicate actions that take place in the example depicted. The flowchart illustrates how the method described herein may be applied, in each wireless device in the group of wireless devices 130. In the Figure, the wireless devices in the group 130 are MTC devices, and are referred to in the Figure as UEs. The first wireless device 131 is represented as $1^{st}$ UE, and the second wireless device 132 is represented as $2^{nd}$ UE. In the example of FIG. 3*b*, the first condition is a need for enhancement of coverage.

Information about a maximal number N of UE context for MTC devices may be kept in a memory in the network node 110, e.g. a base station 110.

The N devices in the cell 120 with the largest need for coverage enhancement may then be kept in active mode, e.g., RRC Connected Mode, after an initial connection setup, e.g., at power-on. This may be completely controlled by the network node 110, which may simply just not release these MTC devices to the inactive mode, e.g., RRC Idle Mode. There may therefore in the normal case not be any impact on procedures in the wireless device at all.

According to embodiments herein, the first wireless device 131, may be evaluated to see if it is among the N wireless devices in the group 130 having the value for the first condition among the number of highest values for the first condition. That is, because the first condition is the need for enhancement of coverage, the network node 110 may determine if the first wireless device 131 is among the N wireless devices in the group 130 needing the most coverage enhancement, as described in action 201. This action is represented in the Figure by the box "1st UE need among N highest needs?". The determination of action 201 may start e.g., when the inactivity timer expires, "UE inactivity timer expires" in the FIG. 3a.

In some embodiments, whether the first wireless device 131 is or is not among the N ones needing the most e.g., coverage enhancement, the network node 110 may determine the value for the second condition, as described in action 202. This is not illustrated to simplify the Figure. Based on the outcome of actions 201 and 202, the network node 110 may then determine if the first wireless device 131 should be in the register. This is represented in the Figure with the box "Should $1^{st}$ UE be in register?". This register or list may be referred to as the 'coverage enhancement-connected register'.

Whether the first wireless device 131 should or should not be in the register, the network node 110 may then update the register according to action 203. The network node 110 may first determine if the first wireless device 131 is in the register, as described in action 203a. The network node 210 may then take different actions, based on the outcome of actions 201-203a.

In a first outcome, the network node 110 may determine that the first wireless device 131 is in the register, but it should not be. This may happen when the first wireless device 131 is no longer among the N wireless devices having the highest need for coverage enhancement. Alternatively, this may be based on the value of the second condition. The network node 210 may then update the register by removing the first wireless device 131 from the register, which is not illustrated to simplify the Figure, and sending it to the inactive mode, e.g., RRC Idle Mode. This is represented in the Figure by the arrow "Yes, but it should not be" going to the box "Send UE to Idle". The network node 110 may then wait, for example, until the next time point when the determination of action 201 is performed. This is represented in the Figure by the arrow from the box "Send UE to Idle" going to the box "Await next data session".

In a second outcome, the network node 110 may determine that the first wireless device 131 is already in the register and it should be. This may happen when the first wireless device 131 is still among the N wireless devices having the highest need for coverage enhancement. This may be further based on the value of the second condition. The network node 210 may then keep the first wireless device 131 in active mode, e.g., RRC Connected Mode, according to action 204. This is represented in the Figure by the arrow "Yes, and it should be" going to the box "Keep 1st UE in active mode".

In a third outcome, the network node 110 may determine that the first wireless device 131 is not in the register, and it should not be. This may happen when the first wireless device 131 is still not among the N wireless devices having the highest need for coverage enhancement. Alternatively, this may be based on the value of the second condition. The network node 210 may then send the first wireless device 131 to the inactive mode, and then wait for the next time point when the determination of action 201 is performed. This is represented in the Figure by the arrow "No, and it should not be" going to the box "Send UE to Idle".

In the fourth outcome, the network node 110 may determine that the first wireless device 131 is not in the register, but that it should be. This may happen when the first wireless device 131 is now among the N wireless devices having the highest need for coverage enhancement. Alternatively, this may be based on the value of the second condition. The network node 110 may then determine if the register already comprises the maximum amount of wireless devices in the group of wireless devices 130 allowed to be in active mode simultaneously, according to action 203b. That is, the network node 110 may determine if the number of wireless devices in the register is equal to N, as described above in action 203b. This is represented in the Figure by the arrow "No, and it should be" going to the diamond "Register full? (register contains N UEs?)".

If the outcome of this determination is that the register is not full, the network node 110 may add the first wireless device 131 to the register, according to action 203d. This is represented in the flowchart by the "No" arrow going to the box "Add $1^{st}$ UE to register". The first wireless device 131 is then kept in active mode according to action 204. This is represented in the flowchart by the arrow going to the box "Keep $1^{st}$ UE in active mode".

If the outcome of action 203b is that the register is full, the network node 110 may need to make room in the register for the first wireless device 131, and may de-register the second wireless device 132, which requires less coverage enhancement, and which is already in the register. That is, the network node 110 may remove the second wireless device 132 from the register of wireless devices 140 to be kept in active mode, when the second wireless device 132 has a lower value for the first condition than the value for the first condition of the first wireless device 131, according to action 203c. The network node 110 may then send the second wireless device 132 to RRC Idle Mode. This is represented in FIG. 3 by the "Yes" arrow going to the box "Remove $2^{nd}$ UE from register (Send UE in register with lowest need to Idle)". The network node 110 may then add the first wireless device 131 to the register, according to action 203d. This is represented in the flowchart by the arrow going from box 203c to the box "Add $1^{st}$ UE to register". The first wireless device 131 is then kept in active mode according to action 204. This is represented in the flowchart by the arrow going to the box "Keep $1^{st}$ UE in active mode".

When the first wireless device 131 is kept in active mode, e.g., RRC Connected Mode, it may be kept in active mode, for example, until the next time point when the determination of action 201 is performed. That is, kept in RRC Connected Mode while waiting for the next data session. This is represented in the Figure by the arrow "No, and it should not be" going to the box "Await next data session".

In some embodiments not represented in FIG. 3b, if the first wireless device 131 is not among the N ones needing the most coverage enhancement, as determined in action 201, the network node 110 may skip action 202, and it may update the register by determining if the first wireless device 131 is in the register, as described in action 203a. If the first wireless device 131 is in the register, but the network node 110 has determined that the first wireless device 131 is no longer among the N wireless devices 130 in the group with highest needs, the network node 110 may simply send the first wireless device 131 to inactive mode, e.g., RRC Idle Mode, as described above.

As mentioned earlier, the need for coverage enhancement condition may be replaced with any other property that improves when the UE is kept in RRC Connected Mode. As mentioned above, this may be, for example, latency or battery life.

To perform the method actions described above in relation to FIGS. 2 and 3, the network node 110 is configured to keep the wireless devices 140 in active mode. The network node 110 may comprise the following arrangement depicted in FIG. 4. As already mentioned, the wireless devices 140 are arranged to be comprised in the group of wireless devices 130 configured to be served by the network node 110. Each of the wireless devices in the group of wireless devices 130 is configured to have the value for the first condition. The group of wireless devices 130 and the network node 110 are configured to operate in the wireless communications network 100.

As stated earlier, some embodiments, the active mode is the Radio Resource Control_Connected mode.

The detailed description of some of the following corresponds to the same references provided above, in relation to the actions described for the network node 110, and will thus not be repeated here.

For example, the first condition may be the need for enhancement of one of: coverage, latency, and battery life.

The network node 110 is further configured to, e.g., by means of a determining module 401 configured to, determine whether each of the wireless devices in the group of wireless devices 130 has the value for the first condition among the number of highest values for the first condition in the group of wireless devices 130, wherein the first condition of each of the wireless devices in the group of wireless devices 130 is associated with the need to be in active mode, and wherein the number of highest values for the first condition corresponds to the maximum amount of wireless devices in the group of wireless devices 130 allowed to be in the active mode simultaneously.

The determining module 401 may be a processor 402 of the network node 110.

In some embodiments, the network node 110 may be further configured to determine the value for the second condition for at least some of the wireless devices in the group of wireless devices 130, wherein the value for the second condition of the at least some of the wireless devices in the group of wireless devices 130 is associated with being kept in active mode.

The second condition may be the need for enhancement of one of: coverage, latency, battery life and mobility, wherein the first condition is different from the second condition The network node 110 is further configured to, based on the determination, e.g., by means of an updating module 404 configured to, update the register of wireless devices 140 to be kept in active mode, so that the wireless devices 140 in the register have the highest values for the first condition in the group 130, according to the maximum amount of wireless devices in the group of wireless devices 130 allowed to be in the active mode simultaneously.

The updating module 404 may be the processor 402 of the network node 110.

To update the register may be configured to comprise to add a wireless device in the group of wireless devices 130 to the register, to remove a wireless device in the group of wireless devices 130 from the register, or to confirm the presence of a wireless device in the group of wireless devices 130 in the register. Any of the to add and to remove may be based on the maximum amount of wireless devices in the group of wireless devices 130 allowed to be in the active mode simultaneously.

In some embodiments, to update is configured to comprise:

a) to determine that the first wireless device 131 having the value for the first condition among the number of highest values for the first condition in the group of wireless devices 130, is not in the register of wireless devices 140 to be kept in active mode, b) to determine that the register of wireless devices 140 to be kept in active mode comprises the maximum amount of wireless devices in the group of wireless devices 130 allowed to be in active mode simultaneously, c) to remove the second wireless device 132 from the register of wireless devices 140 to be kept in active mode, when the second wireless device 132 has a lower value for the first condition than the value for the first condition of the first wireless device 131, and d) to add the first wireless device 131 to the register of wireless devices 140 to be kept in active mode.

In some embodiments, the update is further based on the determination of the value for the second condition.

The network node 110 is further configured to, e.g., by means of a keeping module 404 configured to, keep the wireless devices 140 in the updated register in active mode.

The keeping module 404 may be the processor 402 of the network node 110.

In some embodiments, the active mode for a wireless device is configured to end when the timer expires, and to keep the wireless devices 140 in the active mode comprises the active mode continuing after the timer expires.

To keep may be configured to comprise to extend Discontinuous Reception cycles in the Radio Resource Control_Connected mode.

Figure 4:
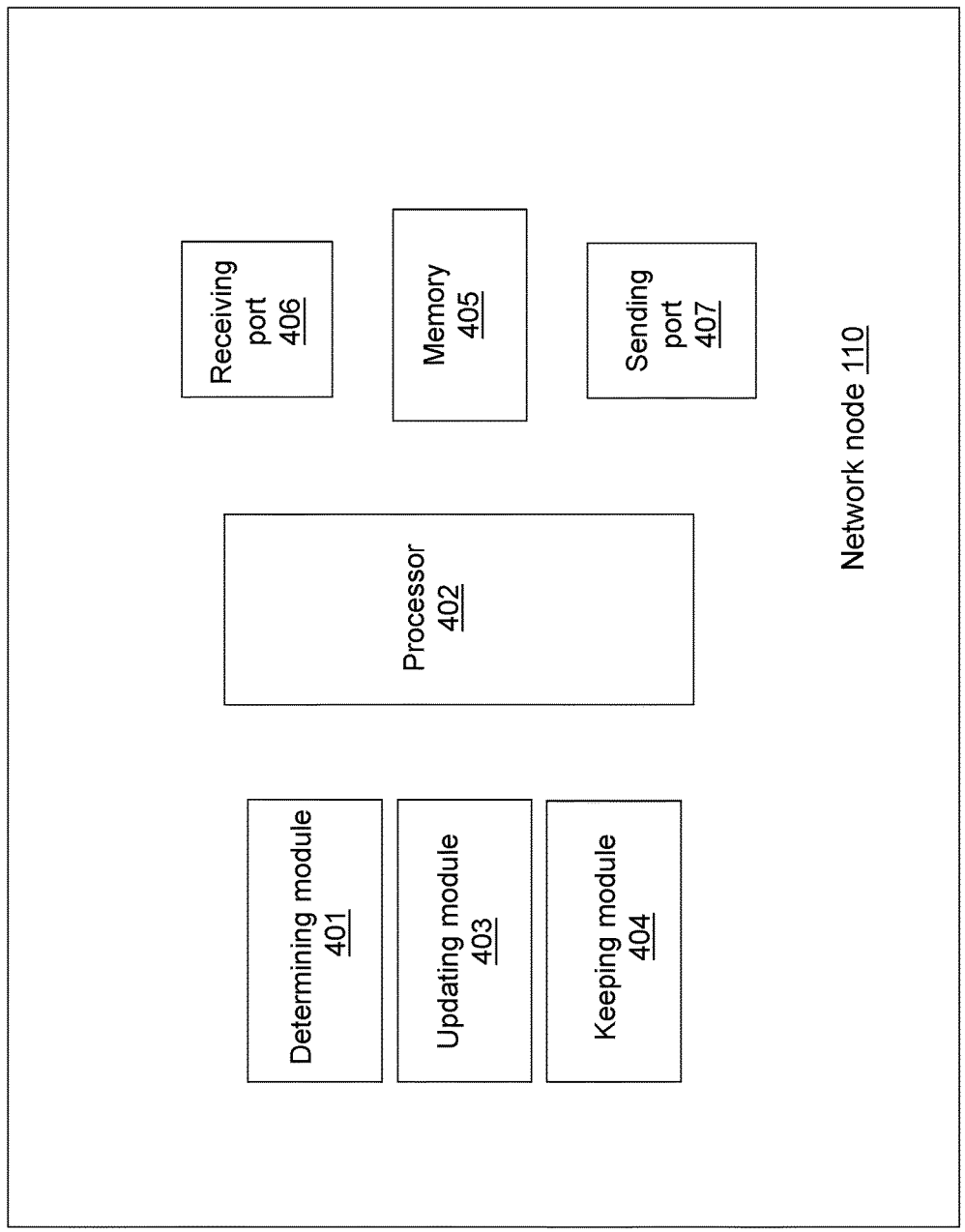
FIG. 4 is a block diagram of a network node that is configured according to some embodiments.

The embodiments herein for keeping the wireless devices 140 in active mode may be implemented through one or more processors, such as the processor 402 in the network node 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110. As indicated above, the processor 402 may comprise one or more circuits, which may also be referred to as one or more modules in some embodiments, each configured to perform the actions carried out by the network node 110, as described above in reference to FIG. 4, e.g., the determining module 401, the updating module 403 and the keeping module 404. Hence, in some embodiments, the determining module 401, the updating module 403 and the keeping module 404 described above may be implemented as one or more applications running on one or more processors such as the processor 402. That is, the methods according to the embodiments described herein for the network node 110 are respectively implemented by means of a computer program product, comprising instructions, i.e., software code portions, which, when executed on at least one processor, cause the at least one processor to carry out the actions described herein, as performed by the network node 110. The computer program product may be stored on a computer-readable storage medium. The computer-readable storage medium, having stored thereon the computer program, may comprise instructions which, when executed on at least one processor, cause the at least one processor to carry out the actions described herein, as performed by the network node 110. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The network node 110 may further comprise a memory 405 comprising one or more memory units. The memory 405 may be arranged to be used to store obtained information, such as the information received by the processor 402, store data configurations, schedulings, and applications etc. to perform the methods herein when being executed in the network node 110. Memory 405 may be in communication with the processor 402. Any of the other information processed by the processor 402 may also be stored in the memory 405.

In some embodiments, information e.g., from any of the wireless devices in the group of wireless devices 130, may be received through a receiving port 406. The receiving port 406 may be in communication with the processor 402. The receiving port 406 may also be configured to receive other information.

The processor 402 may be further configured to send messages, e.g., to any of the wireless devices in the group of wireless devices 130, through a sending port 407, which may be in communication with the processor 402, and the memory 405.

Those skilled in the art will also appreciate that the any module within the network node 110, e.g., determining module 401, the updating module 403 and the keeping module 404 described above, may refer to a combination of analog and digital circuits, and/or one or more processors configured with software and/or firmware, e.g. stored in the memory, that when executed by the one or more processors such as the processor 402, perform actions as described above, in relation to FIGS. 2-3. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

The description just provided for the network node 110 may be understood to correspond to an apparatus 110 configured to keep the wireless devices 140 in active mode. The wireless devices 140 are arranged to be comprised in the group of wireless devices 130 configured to be served by the network node 110. Each of the wireless devices in the group of wireless devices 130 is configured to have the value for the first condition. The group of wireless devices 130 and the network node 110 are configured to operate in the wireless communications network 100. The apparatus 110 comprises the processor 402 and the memory 405. Said memory 405 contains instructions executable by said processor 402, whereby said apparatus 110 is operative to determine whether each of the wireless devices in the group of wireless devices 130 has the value for the first condition among the number of highest values for the first condition in the group of wireless devices 130, wherein the first condition of each of the wireless devices in the group of wireless devices 130 is associated with the need to be in active mode, and wherein the number of highest values for the first condition corresponds to the maximum amount of wireless devices in the group of wireless devices 130 allowed to be in the active mode simultaneously. Said memory 405 also contains instructions executable by said processor 402, whereby said apparatus 110 is operative to, based on the determination, update the register of wireless devices 140 to be kept in active mode, so that the wireless devices 140 in the register have the highest values for the first condition in the group 130, according to the maximum amount of wireless devices in the group of wireless devices 130 allowed to be in the active mode simultaneously, keep the wireless devices 140 in the updated register in active mode When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a network node for keeping wireless devices in an active mode, the wireless devices being comprised in a group of wireless devices served by the network node, wherein each of the wireless devices in the group of wireless devices has a value for a first condition, the group of wireless devices and the network node operating in a wireless communications network, the method comprising:
   determining whether each of the wireless devices in the group of wireless devices has the value for the first condition among a number of highest values for the first condition in the group of wireless devices, wherein the first condition of each of the wireless devices in the group of wireless devices is associated with a need to be in the active mode, and wherein the number of highest values for the first condition corresponds to a maximum number of wireless devices in the group of wireless devices allowed to be in the active mode simultaneously;
   based on the determining, updating a register of wireless devices to be kept in the active mode, so that the wireless devices in the register have the highest values for the first condition in the group of wireless devices, according to the maximum number of wireless devices in the group of wireless devices allowed to be in the active mode simultaneously, wherein the updating comprises:
      determining that a first wireless device having a value for the first condition among the number of highest values for the first condition in the group of wireless devices, is not in the register of wireless devices to be kept in the active mode;
      determining that the register of wireless devices to be kept in the active mode comprises the maximum number of wireless devices in the group of wireless devices allowed to be in the active mode simultaneously;
      removing a second wireless device from the register of wireless devices to be kept in the active mode, when the second wireless device has a lower value for the first condition than the value for the first condition of the first wireless device; and
      adding the first wireless device to the register of wireless devices to be kept in the active mode; and
   keeping the wireless devices in the updated register in the active mode.

2. The method of claim 1, wherein the active mode for a wireless device ends when a timer expires, and wherein keeping the wireless devices in the active mode comprises continuing the active mode for the wireless device after the timer expires.

3. The method of claim 1, wherein the first condition is a need for enhancement of one of: coverage, latency, and battery life.

4. The method of claim 1, further comprising:
determining a value for a second condition for at least some of the wireless devices in the group of wireless devices, wherein the value for the second condition of the at least some of the wireless devices in the group of wireless devices is associated with a need to keep the at least some of the wireless devices in the active mode, and wherein the updating is further based on the determining of the value for the second condition.

5. The method of claim 4, wherein the second condition is a need for enhancement of one of: coverage, latency, battery life and mobility, and wherein the first condition is different from the second condition.

6. The method of claim 1, wherein the active mode is a Radio Resource Control_Connected mode.

7. The method of claim 6, wherein the keeping comprises extending Discontinuous Reception cycles in the Radio Resource Control Connected mode.

8. An apparatus configured to keep wireless devices in an active mode, the wireless devices being arranged to be comprised in a group of wireless devices configured to be served by a network node, wherein each of the wireless devices in the group of wireless devices is configured to have a value for a first condition, the group of wireless devices and the network node being configured to operate in a wireless communications network, the apparatus comprising a processor and memory, said memory containing instructions executable by said processor, whereby said processor and said memory together form at least part of a processing circuit configured to:
determine whether each of the wireless devices in the group of wireless devices has the value for the first condition among a number of highest values for the first condition in the group of wireless devices, wherein the first condition of each of the wireless devices in the group of wireless devices is associated with a need to be in the active mode, and wherein the number of highest values for the first condition corresponds to a maximum number amount of wireless devices in the group of wireless devices allowed to be in the active mode simultaneously;
based on the determination, update a register of wireless devices to be kept in the active mode, so that the wireless devices in the register have the highest values for the first condition in the group of wireless devices, according to the maximum number of wireless devices in the group of wireless devices allowed to be in the active mode simultaneously, wherein to update the register of wireless devices, the processing circuit is configured to:
determine that a first wireless device having a value for the first condition among the number of highest values for the first condition in the group of wireless devices, is not in the register of wireless devices to be kept in the active mode;
determine that the register of wireless devices to be kept in the active mode comprises the maximum number of wireless devices in the group of wireless devices allowed to be in the active mode simultaneously;
remove a second wireless device from the register of wireless devices to be kept in the active mode, when the second wireless device has a lower value for the first condition than the value for the first condition of the first wireless device; and add the first wireless device to the register of wireless devices to be kept in the active mode; and
keep the wireless devices in the updated register in the active mode.

9. The apparatus of claim 8, wherein the active mode for a wireless device is configured to end when a timer expires, and wherein the processing circuit is configured to keep the wireless devices in the active mode by continuing the active mode after the timer expires.

10. The apparatus of claim 8, wherein the first condition is a need for enhancement of one of: coverage, latency, and battery life.

11. The apparatus of claim 8, wherein the processing circuit is further configured to:
determine a value for a second condition for at least some of the wireless devices in the group of wireless devices, wherein the value for the second condition of the at least some of the wireless devices in the group of wireless devices is associated with a need to keep the at least some of the wireless devices in the active mode, and wherein the update is further based on the determination of the value for the second condition.

12. The apparatus of claim 11, wherein the second condition is a need for enhancement of one of: coverage, latency, battery life and mobility, and wherein the first condition is different from the second condition.

13. The apparatus of claim 8, wherein the active mode is a Radio Resource Control Connected mode.

14. The apparatus of claim 13, wherein the processing circuit is configured to perform said keeping by extending Discontinuous Reception cycles in the Radio Resource Control Connected mode.

15. A non-transitory computer-readable medium comprising, stored thereupon, a computer program comprising instructions that, when executed on at least one processor of a network node serving a group of wireless devices, each of the wireless devices in the group of wireless devices having a value for a first condition, the group of wireless devices and the network node operating in a wireless communications network, cause the network node to:
determine whether each of the wireless devices in the group of wireless devices has the value for the first condition among a number of highest values for the first condition in the group of wireless devices, wherein the first condition of each of the wireless devices in the group of wireless devices is associated with a need to be in an active mode, and wherein the number of highest values for the first condition corresponds to a maximum number of wireless devices in the group of wireless devices allowed to be in the active mode simultaneously;
based on the determination, update a register of wireless devices to be kept in the active mode, so that the wireless devices in the register have the highest values for the first condition in the group of wireless devices, according to the maximum number of wireless devices in the group of wireless devices allowed to be in the active mode simultaneously, wherein to update the register of wireless devices, the instructions, when executed on the at least one processor, further cause the network node to:
determine that a first wireless device having a value for the first condition among the number of highest values for the first condition in the group of wireless devices, is not in the register of wireless devices to be kept in the active mode;

determine that the register of wireless devices to be kept in the active mode comprises the maximum number of wireless devices in the group of wireless devices allowed to be in the active mode simultaneously;

remove a second wireless device from the register of wireless devices to be kept in the active mode, when the second wireless device has a lower value for the first condition than the value for the first condition of the first wireless device; and add the first wireless device to the register of wireless devices to be kept in the active mode; and keep the wireless devices in the updated register in the active mode.

\* \* \* \* \*